United States Patent
Roth et al.

(10) Patent No.: US 6,288,222 B1
(45) Date of Patent: *Sep. 11, 2001

(54) METHOD OF FILTRATION OF A DAIRY STREAM

(75) Inventors: Stephen A. Roth, Gladwyne; Jonathan K. Weil, Lansdale; Michael Spade, Fairless Hills, all of PA (US)

(73) Assignee: Neose Technologies, Inc., Horsham, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/504,716

(22) Filed: Feb. 16, 2000

(51) Int. Cl.[7] .................. C07H 1/06; C07H 1/08
(52) U.S. Cl. ............... 536/127; 536/124; 127/30; 127/31; 127/36; 514/54; 514/53; 514/23; 424/401; 424/400; 424/439
(58) Field of Search ................ 424/400, 401, 424/439; 536/127, 124; 514/54, 53, 23

(56) References Cited

U.S. PATENT DOCUMENTS

| | | | |
|---|---|---|---|
| 4,042,576 | * 8/1977 | Eustache | 260/112 |
| 4,081,326 | * 3/1978 | Hall | 195/7 |
| 4,376,023 | * 3/1983 | Venkatsubramanian et al. | 204/180 |
| 4,497,836 | * 2/1985 | Marquardt et al. | 426/239 |
| 4,844,923 | * 7/1989 | Hermann | 426/239 |
| 5,118,516 | * 6/1992 | Shimatani et al. | 426/271 |
| 5,270,462 | * 12/1993 | Shimatani et al. | 536/17.2 |
| 5,707,678 | * 1/1998 | Gregory | 426/583 |
| 5,714,075 | * 2/1998 | Brian et al. | 210/670 |

FOREIGN PATENT DOCUMENTS 1-168693 * 7/1989 (JP).
3-143351 * 9/1998 (JP).

OTHER PUBLICATIONS

Biotechnology and Bioengineering, vol. 69, No. 4, Aug. 20, 2000, Douglas B. Sarney, et al., "A Novel Approach to the Recovery of Biologically Active Oligosaccharides from Milk Using a Combination of Enzymatic Treatment and Nanofiltration", pp. 461–467.

* cited by examiner

Primary Examiner—Thurman K. Page
Assistant Examiner—Liliana Di Nola Baron
(74) Attorney, Agent, or Firm—Oblon, Spivak, McClelland, Maier & Neustadt, P.C.

(57) ABSTRACT

This invention relates to a method of filtering of a dairy stream.

16 Claims, No Drawings

METHOD OF FILTRATION OF A DAIRY STREAM

BACKGROUND OF THE INVENTION

1. Field of the Invention

This invention relates to a method of filtering of a dairy stream.

2. Discussion of the Background

Whey is a major by-product of cheese making, which, for environmental reasons, presents a difficult waste disposal problem. Whey is typically composed of about 5 wt. % lactose, 1 wt. % protein and about 0.5 wt. % salts, where the balance of the mixture is water. While the protein component can often be recovered by ultra-filtration, and accordingly used in food products, the lactose component, has heretofore been of little value.

One method of increasing the economic value of whey waste streams is to isolate sialyloligosaccharides from the waste stream. Anion exchange chromatography is effective for removing charged sialyloligosaccharide components from lactose. The presence of salts, especially citrate salts from acid addition, can greatly reduce the effectiveness of sialyloligosaccharide removal, such that it is conventional to remove salts from a whey waste stream in order to achieve effective recovery of sialyloligosaccharides.

Methods for removing sialyloligosaccharide fractions have been reported, but the extraction and ion exchange methods have not been entirely satisfactory from the stand point of throughput and purity.

Shimatani et al. U.S. Pat. No. 5,118,516 report the isolation of sialic acid-containing lactose, from whey, skim milk or a deproteinized solution by (a) electrodialysis, or (b) ion exchange by a cation-exchange resin and a strongly basic anion-exchange resin, or (c) a combination of electrodialysis and ion exchange by the cation-exchange resin and the strongly basic anion-exchange resin to desalt the permeate.

Shimatani et al. U.S. Pat. No. 5,270,462 report a process of manufacturing a composition containing a high concentration of sialic acids, by adjusting the pH of cheese whey to be acidic, contacting the whey with a cation exchanger, followed by concentrating and desalting the eluent.

J P Kokai 01-168,693 reports the preparation of a sialic acid composition, by subjecting milk, non-fat milk, buttermilk or whey to ultrafiltration, fractionating at 20,000 to 500,000 Daltons at a pH of 4.0 to 6.0, followed by a second ultrafiltration, fractionating at 1,000 to 10,000 Daltons at a pH of 6.0 to 8.0 under 0.2 to 2.0 MPa, to remove impurities such as lactose. The residual is spray dried or lyophilized.

J P Kokai 03-143,351 reports the recovery of oligosaccharide bonding type sialic acid from an alkali cleaning waste liquid of anion exchange resin formed at desalting of whey, by neutralization, ultrafiltration, reverse osmosis, desalting, absorption of the sialic acid onto a strong basic type anion exchange resin, followed by elution, desalting and drying.

J P Kokai 59-184,197 reports the manufacture of oligosaccharides attached to sialic acids, by desalting a sialyloligosaccharide-containing molasses, passing the desalted solution through an anion exchange column, neutralizing the eluate and desalting the eluate by electrophoresis.

Gregory et al. U.S. Pat. No. 5,707,678 reports a method of microfiltration of milk or colostral whey, in which after removal of fat and casein, ultrafiltration at a pH of from 4.5 to 5.0 provides for a whey product which can be microfiltered without fouling of a microfilter membrane or depth filter. The isolation of sialyloligosaccharides is not reported.

Marquardt et al. U.S. Pat. No. 4,497,836 reports a process for preparing a product suitable for use in infant food formulas in which a mineral rich edible cheese whey is subjected to ultrafiltration to produce a protein-rich retenate and a lactose-rich permeate. The lactose-rich permeate is then partially demineralized, such as by electrolysis and blended with the protein-rich retentate. In this fashion, demineralization is possible. Also in this process, the retentate is a protein-rich composition and the permeate is rich in lactose and minerals. The creation of a retentate rich in sialyloligosaccharides is not disclosed.

Venkatsubramanian et al. U.S. Pat. No. 4,376,023 reports a process in which a product stream comprising dextrose and oligosaccharides is separated in an electro-osmosis cell, by using alternating ion exchange membranes of high and low permeability, in which dextrose is selectively removed resulting in separate effluent streams enriched in dextrose and oligosaccharide respectively are obtained.

Hall U.S. Pat. No. 4,081,326 reports a method of obtaining an oligosaccharide composition, essentially free of $G_4$ and lower saccharides, by treatment of an oligosaccharide composition containing $G_4$ and lower saccharides with both a baker's yeast and a maltase.

Herrmann U.S. Pat. No. 4,844,923 reports a method of removing serum proteins from milk products by acidic precipitation, in which at least partial demineralization prior to acid precipitation was found to increase greatly the efficiency of the process. Removal of sialyloligosaccharides by reverse osmosis is not disclosed.

Eustache U.S. Pat. No. 4,042,576 reports a method of extracting glycoproteins and sialic acid from whey, in which proteins are flocculated by thermal treatment and the supernatent is then ultrafiltered. The ultrafiltration retentate is treated by hydrolysis, and the sialic acid is then extracted from the hydrolysis supernatent. Adjustment of the pH in the ultrafiltration to control the retentate composition is not disclosed.

Brian et al. U.S. Pat. No. 5,714,075 report processing of a cheese processing waste stream in which sialyloligosaccharides are obtained, by ion exchange chromatography to obtain the lithium salt of a sialyloligosaccharide and by extraction with a solvent.

A specific problem with purity encountered with isolation of sialyloligosaccharides by filtration methods, is separation from lactose. Due to similarities in molecular size, it is often difficult to isolate sialyloligosaccharides, in the absence of lactose, from a waste stream by filtration. Accordingly, filtration methods of obtaining sialyloligosaccharides in high purity, from a dairy stream would be welcome.

The present invention addresses this problem by providing a method of processing a dairy stream containing sialyloligosaccharides and lactose, in which the dairy stream is treated to effect hydrolysis of lactose prior to separation of sialyloligosaccharides.

SUMMARY OF THE INVENTION

Accordingly, one object of this invention is to provide a novel method of processing sialyloligosaccharides from a dairy stream.

A second object of this invention is to provide a novel method of processing sialyloligosaccharides from a dairy stream which has been subjected to hydrolysis of lactose, prior to separation of sialyloligosaccharides.

The objects of the present invention are provided for by a method of processing sialyloligosaccharides from a dairy stream comprising a sialyloligosaccharide and lactose which comprises:

i) hydrolyzing a lactose of a dairy stream comprising lactose and a sialyloligosaccharide;

ii) separating sialyloligosaccharides.

It has been discovered that siayloligosaccharides purity can be enhance when separation is conducted on a dairy stream, in which lactose has been hydrolyzed to glucose and galactose.

DETAILED DESCRIPTION OF THE PREFERRED EMBODIMENTS

The present invention is based in-part on the discovery that sialyloligosaccharides are more easily separated when separation is conducted on a waste stream from which lactose has been hydrolyzed to glucose and galactose.

Filtration of a hydrolyzed dairy stream may be conducted, provided the waste stream comprises sialyloligosaccharides and lactose. Most dairy streams however, contain additional components other than oligosaccharides, such as proteins, salts and fats, and accordingly their removal may be accomplished by ordinary methods known to those of ordinary skill in the art.

For examples, a dairy stream may be purified to an oligosaccharide fraction by filtration, by conventional methods known to those of ordinary skill in the art.

The nanofiltration membrane will be a reverse osmosis membrane having a molecular weight cut off of about 35,000, such as G20, manufactured by Desal.

Nanofiltration is conducted at a positive pressure of from 10 to 1,000 lbs/psi, preferably 50 to 800 lbs/psi, more preferably 100 to 400 lbs/psi.

The temperature of nanofiltration is not particularly limited and may be conducted from 10° C. to about 40° C. At low pH, and high temperature, the sialyloligosaccharide will begin to degrade.

The size (surface area) of the nanofiltration membrane may be selected as appropriate by those of skill in the art, depending on the volume of dairy stream being treated, the concentration of material in the solution being nanofiltered and the desired throughput.

After obtaining an oligosaccharide containing fraction, sialyloligosaccharides may be further purified by hydrolysis of lactose and separation.

There is no particular limitation to the method used to hydrolyze lactose in the waste stream to be processed. Treatment with an hydrolytic enzyme selective for the cleavage of the glucose-galactose linkage of lactose is preferred. The use of a hydrolysis treatment is sufficient to hydrolyze lactose into monosaccharides glucose and galactose, without significantly hydrolyzing the sialyloligosacchride component.

Within the context of the present invention a sialyloligosaccharide will include, but is not limited to 3' sialyllactose, 6' sialyllactose, 6'sialyllactosamine, 3' sialylactosamine and disialolactose.

Preferably, hydrolysis is conducted under conditions such that the ratio between the rate of hydrolysis of lactose to the rate of hydrolysis of sialyloligosaccharide is >10:1, more preferably >15:1, even more preferably >20:1, more preferably >500:1 and even more preferably >50,000:1.

In one embodiment, hydrolysis is catalyzed by an enzyme, in particular a β-galactosidase enzyme. A suitable β-galactosidase enzyme may be obtained by conventional methods known to those of ordinary skill in the art, without undue experientation. In a preferred embodiment, a β-galactosidase, is made by fermentation of Aspergillus. Suitable enzyme may be obtained from Enzyme Development corp of New York. Suitable enzyme is also available as Lactaid® from McNeil Consumer products division of Johnson and Johnson.

Typically enzymatic hydrolysis is conducted in an aqueous medium, such as water, which may further comprise additional components, known to those of ordinary skill in the art.

The pH of the dairy stream may be adjusted by convention methods known to those of ordinary skill in the art in order to maximize the differentiation in hydrolysis rate of lactose relative to sialyloligosaccharides. For example, a pH of from 3–8, preferably from 4–7, more preferably about 5.5 may be chosen. The desired pH range may be obtained by adding a protonic acid such as HCl, $H_2SO_4$, HOAc, oxalic acid, citric acid or lactic acid.

If necessary the pH may also be adjusted by adding a suitable base such as NaOH, $NaHCO_3$, ammonia.

The reaction medium may be buffered, in order to adjust the pH to the optimum activity of the cleavage of the glucose-galactose bond. Suitable buffers may be selected by those of ordinary skill in the art. However, from the perspective of minimizing the ionic strength of the reaction medium, a buffer with high capacity is chosen.

Whey is a suitable hydrolysis medium, as it typically is acidic as a result of the action of lactic acid producing bacteria on lactose.

The amount of enzyme used to effect hydrolysis of the dairy stream is not particulary limited and may be selected in order to obtain cost efficient and time efficient hydrolysis, for a given enzyme of a given activity. 4,500 activity units of a β-galactosidase are effective to hydrolyze >99% of a solution containing 0.45 g of lactose in about 1 h, where an activity unit will hydrolyze 1 micromole (342 µg) of lactose in one minute. Acceptable rates of hydrolysis are observes with as little as 40 activity units acting on 0.45 g of lactose.

The reaction temperature is not particulary limited and may be selected to obtain cost and time efficient hydrolysis, typically 10 to 55° C., preferably 20–40° C., more preferably 25–38° C., more preferably about 37° C. While there is no lose of selectivity observed at the high end of the temperature range, the combination of high temperature and low pH (a pH of about 2) can result in degradation of sialyloligosaccharides and β-galactosidase enzyme.

After hydrolysis of the lactose component of the dairy stream, separation of the hydrolyzed material into a sialyloligosacchride containing fraction and a glucose/galactose containing fraction, may be performed.

Separation of the sialyloligosaccharide component from the hydrolyzed dairy stream, may be by conventional methods known to those of ordinary skill in the art, such as by filtration (nanofiltration and ultrafiltration, crystallization and chromatography).

Separation may be by nanofiltration through a membrane, separating based on molecular weight and/or charge. For example a suitable membrane is Desal GK sheet membrane spiral wound, ceramic, polyether sulfone, polyvinyl difluoride and regenerated cellulose. Typical membrane selectivity, under a general conditions, will be >50:1, preferably >75:1, more preferably >100:1, even more preferably >500:1, in selecting glucose and galactose over a sialyloligosaccharide.

Nanofiltration conditions may be selected by those of ordinary skill in the art, to produce an acceptable level of separation, at an acceptable rate. Adjustment of pressure (typically 10 to 1,000 psig, preferably 200–300 psig), temperature, typically 10 to 60° C., preferably 25–38° C., and flow rate, will be sufficient to obtain acceptable levels of separation. The pH is not particularly limited, however at a pH below 3, sialyllactose is typically passed through the membrane.

In a preferred embodiment the resulting sialyloligosaccharide containing component has an enrichment in sialyloligosaccharide to lactose of >50:1, preferably >75:1, more preferably >100:1, even more preferably >500:1, relative to to oligosaccharide component prior to hydrolysis.

The retentate, after nanofiltration, may have a residual lactose content of ≦5 wt. %, preferably ≦3 wt. %, more preferably ≦1 wt. %, even more preferably ≦0.5 wt %.

The retente after nanofiltration may have a residual combined glucose and galactose content of ≦5 wt. %, preferably ≦3 wt. %, more preferably ≦1 wt. %, even more preferably ≦0.5 wt %.

The dairy stream, which is processed according to the present invention, may be obtained from any waste stream generated during a cheese making process. For example acid whey, is generated by separating the solids when skim milk is coagulated to form cottage cheese. Acid whey is characterized by a high lactic acid content. When cheese is prepared from whole milk, the remaining liquid is sweet whey, which can be further processed by evaporation to form dry whey powder. Sweet whey can also be dried, demineralized and evaporated to form demineralized whey permeate. Sweet whey can also be subjected to ultrafiltration to generate both a whey permeate and a whey permeate concentrate. Whey permeate can be further processed by crystallizing lactose to form both lactose and a mother liquor. The mother liquor resulting from crystallizing lactose from a whey permeate is known in the art as "Delac". Suitable dairy streams include colostrum, milk, milk powder, whole whey, demineralized whey permeate, the regeneration stream from demineralized whey permeate, whey permeate, crystallized lactose, spray dried lactose, whey powder, edible lactose, lactose, refined lactose and USP lactose. Preferably the aqueous mother liquor material resulting from crystallizing lactose (i.e. Delac) is used.

Prior to removal of a sialyloligosaccharide fraction, the dairy stream may be processed, to enhance the content of sialyloligosaccharides. For example, a dairy stream which still contains a protein fraction, may be treated with a transsialidase enzyme, which increases the concentration of sialyloligosaccharides, by transferring sialic acid groups from a sialyated protein, to lactose. A suitable transsialidase enzyme is available from Trypanosome. Suitable reaction condition are a temperature of from 25 to 40° C., preferably about 37° C., at an enzyme concentration of 500 u/L, and a solute concentration of 5–10 wt. %, preferably about 7 wt. % and a pH of 4–11, preferably about 6.

Fluid cheese whey is typically dried so as to produce a non-hygroscopic, highly dispersable powder. Fresh fluid whey is clarified by passing through a desludging type clarifier. The whey is separated to remove fat, then concentrated in double or triple effect evaporators to a solids content of about 62% by weight. The solids can be removed by separation at room temperature, or more preferably, the concentrated whey is cooled before the solids are removed. When the dairy stream to be processed is the solids obtained from drying whey, the solids are first dissolved in water, preferably in an amount of about 1 to 620 g, preferably 50 to 200 g, more preferably about 100 g of solids per liter of water. Dissolution of the solids obtained from drying cheese whey can be conducted at room temperature or at elevated temperatures to accelerate the dissolution process and increase the amount of dissolved solids. Preferably, temperatures of from 20–80° C. are suitable.

Any technique known to those of ordinary skill in the art can be used to remove positively charged materials. For example one suitable technique for causing whey protein to be absorbed is by contacting with a cation exchange resin, as described by J. N. DeWitt et al (*Neth. Milk Dairy J.*, 40:41–56 (1986)) and J. S. Ayers et al (*New Zealand J. Dairy Sci. & Tech.*, 21:21–35(1986)), as well as those processes described in J P Kokai 52-151200 and 63-39545 and J P 2-104246 and 2-138295.

Suitable cation exchange resins may be prepared by conventional techniques known to those of ordinary skill in the art. For example a suitable cation exchange resin may be produced from a mixture of polymerizable monofunctional and polyfunctional monomer by radical emulsion polymerization techniques, then functionalized with acidic groups such as carboxylic acid groups or sulfonic acid groups that exist in the protonated form.

The degree of cross-linking in the cation exchange resin can be chosen, depending on the operating conditions of the cation exchange column. A highly cross-linked resin offers the advantage of durability and a high degree of mechanical integrity, however suffers from a decreased porosity and a drop off in mass-transfer. A low-cross-linked resin is more fragile and tends to swell by absorption of mobile phase. A suitable resin may have from 2 to 12% cross-linking, preferably 8% cross-linking.

The particle size of the cation exchange resin is selected to allow for efficient flow of the dairy stream, while still effectively removing the positively charged materials. A suitable particle size for a column 30×18 cm is 100–200 mesh.

Suitable cation exchange resins include but are not limited to CM-Sephadex, SP-Sephadex, CM-Sepharose, S-Sepharose, CM-Cellulose, Cellulose Phosphate, Sulfoxyethyl-Cellulose, Amberlite, Dowex-50W, Dowex HCR-S, Dowex Macroporous Resin, Duolit C433, SP Trisacryl Plus-M, SP Trisacryl Plus-LS, Oxycellulose, AG 50W-X2, AG50W-X4, AG50W-X8, AG 50W-X12. AG 50W-X16, AG MP-50 Resin, Bio-Rex 70. More preferably suitable resins are DOWEX™ 50x8 (an aromatic sulfonic acid linked to a polystyrene crosslinked resin from Dow Chemical) and AMBERLYST™-15, AMBERLITE™ IR-120 AND AMBERLITE™-200 acidic resins.

The dairy stream can be contacted with the cation exchange resin, in any suitable manner which would allow the whey proteins and other positively charged materials to be absorbed onto the cation exchange resin. Preferably the cation exchange resin is loaded onto a column, and the dairy stream is passed through the column, to remove the whey proteins. An amount of cation exchange resin is selected to affect removal of the positively charged materials, and will vary greatly depending on the dairy stream being treated. Typically, when the waste stream is whey permeate, the loading ratio of dairy stream to cation exchange resin may be from 5 to 20, preferably from 8–15, more preferably from 9 to 12:1 v/v.

When contacting is effected in a column, the dairy stream is preferably passed at a rate of from 1 to 70 cm/min, preferably from 2 to 15 cm/min, more preferably at a rate of 4.6 cm/min. A suitable pressure may be selected to obtain the desired flow rate. Typically a pressure of from 0 to 100 PSIG is selected. Suitable flow rates may also be obtained by applying a negative pressure to the eluting end of the column, and collecting the eluent. A combination of both positive and negative pressure may also be used.

The temperature used to contact the dairy stream with the cation exchange resin is not particularly limited, so long as the temperature is not too high to cause decomposition of the components of the waste stream. Generally ambient room temperature of from 17 to 25° C. is used.

Alternatively, the positively charged materials can be removed by such techniques as electrophoresis, ultrafiltration, reverse osmosis or salt precipitation.

Sialyloligosaccharides, such as 3' sialyllactose, 6' sialyl-lactose and 6'sialyllactosamine are useful as bacterial anti-adhesives, anti-infectives and as an additive for infant formula. The utility of sialic acid containing compositions is reported in U.S. Pat. No. 5,270,462. Sialyllactose is also reported as being useful in a method for treating arthritis (U.S. Pat. No. 5,164,374). 3'-sialyllactose may be used to prevent and treat gastric ulcers caused by *Helicobacter pylori*.

Reverse osmosis is preferably conducted at a pressure of from 300–1,600 psi, more preferably from 400–600 psi, even more preferably at a pressure of 450 psi.

After the salts have been removed by reverse osmosis, the resulting material can be concentrated to provide a solid material containing sialyloligosaccharides such as 3'-sialyllactose and 6'-sialyllactose, which can be recrystallized from a mixture of water and organic solvents.

Preferably precipitation solvents are selected from the group of ethanol, acetone, methanol, isopropanol, diethyl ether, t-butyl methyl ether, ethyl acetate, hexane, tetrahydrofuran and water.

In addition, the eluent, from the anion exchange column, which contains a mixture of sialyloligosaccharides which includes 3' sialyllactose, 6' sialyllactose and 6'sialyllactosamine, can be subjected to separation of the sialyloligosaccharides contained therein, by column chromatography on a DOWEX 1x2 anion exchange resin, at pH 4 to 6 using a buffer a suitable salt such as sodium acetate, ammonium acetate or a lithium salt such as lithium acetate, lithium perchlorate, lithium chloride and lithium bromide as an eluent. A solution of lithium acetate is preferred.

Suitable anion exchange resins may be prepared by conventional techniques known to those of ordinary skill in the art as previously described.

The degree of crosslinking in the anion exchange resin can be chosen, depending on the operating conditions of the anion exchange column. A suitable resin may have from 2 to 12% crosslinking, preferably 2% crosslinking.

The particle size of the anion exchange resin is selected to allow for efficient flow of the daily stream, while still effectively affecting chromatographic separation of the negatively charged materials. A suitable particle size for a column 20x100 cm is 200–400 mesh.

Suitable anion exchange resins include but are not limited to DEAE Sephadex, QAE Sephadex, DEAE Sepharose, Q Sepharose, DEAE Sephacel, DEAE Cellulose, Ecteola Cellulose, PEI Cellulose, QAE Cellulose, Amberlite, Dowex 1-X2, Dowex 1-X4, Dowex 1-X8, Dowex 2-X8, Dowex Macroporous Resins, Dowex WGR-2, DEAE Trisacryl Plus-M, DEAE Trisacryl Plus-LS, Amberlite LA-2, AG 1-X2, AG 1-X4, AG 1-X8, AG 2-X8, AG MP-1 Resin, AG 4-X4, AG 3-X4, Bio-Rex 5 and ALIQUAT-336 (tricaprylylmethylammonium chloride from Henkel Corp.). Preferred resins are DOWEX 1x2 (a tri-methylbenzyl ammonium linked to a polystyrene crosslinked resin from Dow Chemical) and AMBERLYST and AMBERLYTE basic resins.

The mixture of sialyloligosaccharides to be separated are subjected to column chromatography on an anion exchange resin. An amount of anion exchange resin is selected to affect separation of the different sialyloligosaccharides. Typically the loading ratio of sialyloligosaccharide to anion exchange resin is from 0.1 to 5, preferably from 0.2 to 4, more preferably 1 grams of material per liter of resin at a loading concentration of from 0 to 10 mM of salt. The chromatography is conducted at a rate of from 1 to 20 cm/h, preferably 4.6 cm/h superficial velocity. A suitable pressure may be selected to obtain the desired flow rate. Typically a pressure of from 0 to 22 PSIG is selected. Suitable flow rates may also be obtained by applying a negative pressure to the eluting end of the column, and collecting the eluent. A combination of both positive and negative pressure may also be used.

Any temperature may be used to contact the dairy stream with the anion exchange resin, so long as the temperature is not too high to cause decomposition of the components of the sialyloligosaccharides. Generally ambient room temperature of from 17 to 25° C. is used.

When the buffer eluent is a lithium salt, the individual sialyloligosaccharides can be isolated by concentrating the eluent to form a solid and washing the lithium salts away with an organic solvent. Isolation of the lithium salt of a sialyloligosaccharide from a lithium salt eluent is as previously described.

The sodium salt of the sialyloligosaccharide can be obtained by conventional ion-exchange techniques, known to those of ordinary skill in the art.

When the buffer eluent is not a lithium salt, the individual sialyloligosaccharides can be isolated by reverse osmosis techniques.

The present invention is also directed to a method of preparing a sialyloligosaccharide containing composition comprising:

i) hydrolyzing a lactose component of a dairy stream comprising lactose and a sialyloligosaccharide;

ii) isolating a sialyloligosaccharide component; and iii) adding said sialyloligosaccharide component to a composition.

Within the context of the present invention, a sialyloligosaccharide containing composition is any non-naturally occurring composition which contains a sialyloligosaccharide. Within the context of the present method, a sialyloligosaccharide component may be added to a composition, or additional components may be added to a sialyloligosaccharide component to form the final composition.

Non-limiting examples of sialyloligosaccharide containing compositions which may be prepared include infant formula, cosmetic compositions, pharmaceutical compositions and food stuffs. Sialyloligosaccharides are found in human milk and incorporation of sialyloligosaccharides into an infant formula would provide an infant formula with a composition which is more similar to human milk. There are benefits resulting from the topical administration of sialyloligosaccharides to skin and accordingly cosmetic compositions containing sialyloligosaccharides are desired. Sialylogosaccharides have been reported as useful in methods for treating arthritis and the treatment and prevention of gastric ulcers caused by *Helicobacter pylori* and accordingly preparation of pharmaceutical compositions containing sialyloligosacchrides is useful. Consumption of sialyloligosacchrides can be beneficial to the health of nerve cells and therefore a foodstuff comprising sialyloligosacchrides would be useful.

The present invention is also directed to a composition comprising:

i) a sialyloligosaccharide;

ii) glucose; and iii) galactose, wherein glucose and galactose are present in a ratio of 0.9 to 1.1:1, preferably 0.95 to 1.05:1.

As a result of hydrolysis of lactose, a dairy stream component, containing sialyloligosaccharides and glucose and galactose is created, in which glucose and galactose is present in nearly a 1:1 ratio, typically from 0.95 to 1.05:1. Such a composition may further comprise a β-galactosidase enzyme and/or lactose.

The present invention is also directed to a method of producing glucose and galactose by hydrolysis of the lactose component of a dairy stream. Using the conditions described above for the hydrolysis of a lactose component of a dairy stream followed by isolation of a sialyloligosaccharide component, a method of producing glucose and galactose from a dairy stream is described. Isolation of glucose and galactose from a hydrolyzed dairy stream maybe by filtration, such as nanofiltration techniques as described above. The method of producing glucose and galactose may further comprise isolation of a sialyloligosaccharide component, resulting in a product stream comprising glucose and galactose and a product stream comprising a sialyloligosaccharide. The method of producing glucose and galactose may further comprise separation of glucose from galactose by conventional methods known to those of ordinary skill in the art, resulting in a product stream comprising glucose and a product stream comprising galactose. Within the context of the present invention a product stream comprising glucose, a product stream comprising galactose, a product stream comprising glucose and galactose and a product stream comprising a sialyloligosaccharide will comprise at least 60 wt. %, preferably at least 75 wt. %, more preferably at least 90 wt. % and even more preferably at least 95 wt. % of the stated component, wt. % being based on the solids content of the product stream.

Other features of the invention will become apparent in the course of the following description of exemplary embodiments which are given for illustration of the invention and are not intended to be limiting thereof.

EXAMPLE 1

4,500 units of β-galactosidase were added to untrafiltered whey permeate, which contained approximately 0.45 g of lactose and 0.1 g 3' sialylllactose, in an aqueous medium at a pH of 5.5 at 37° C. After 60 minutes, the composition of the whey permeate was determined by analysis by HPLC on a BioRad HPX-87H column, to contain less than 1% of the original lactose content at >99 wt. % of the original 3'sialyllactose content.

EXAMPLE 2

Separation of the glucose and galactose from the hydrolyzed whey permeate of Example 1 was accomplished by nanofiltration, at a pressure of 200–300 psig. The effectiveness of removal of solids is detailed below:

| Solids Present | # of diafiltrations to remove 80% solids | Average Removal Rate of Solids | Average Removal Rate of 3' Sialyllactose |
|---|---|---|---|
| glucose, galactose | 3–5 | 65–72% | <0.1% |

EXAMPLE 3

For comparative purposes, a whey permeate containing approximately 0.45 g of lactose and 0.1 g of 3'sialyllactose was subject to nanofiltration, using a Desal GK membrane at a pressure of 200–300 psig. The whey permeate was not hydrolyzed by treatment with a β-galactosidase enzyme. The effectiveness of removal of solids is detailed below:

| Solids Present | # of diafiltrations to remove 80% solids | Average Removal Rate of Solids | Average Removal Rate of 3' Sialyllactose |
|---|---|---|---|
| lactose | >7 | 25–40% | <0.1% |

Obviously numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of processing a dairy stream comprising:
   i) hydrolyzing a lactose component of a dairy stream comprising lactose and a sialyloligosaccharide; and
   ii) isolating a sialyloligosaccharide component.

2. The method of claim 1, wherein hydrolysis is conducted with a β-galactosidase enzyme.

3. The method of claim 1, wherein a ratio of rate of lactose hydrolysis to sialyloligosaccharide hydrolysis is 10:1.

4. The method of claim 1, wherein said sialyloligosaccharide component is isolated by membrane filtration.

5. The method of claim 4, wherein said membrane filtration is nanofiltration.

6. The method of claim 4, wherein nanofiltration is performed using a Desal Gk membrane.

7. The method of claim 1, wherein said sialyloligosaccharide component has a lactose content of ≦5 wt. %.

8. The method of claim 1, wherein said sialyloligsaccharide component has a glucose and galactose content of ≦5 wt. %.

9. The method of claim 1, wherein said sialyloligsaccharide component comprises a sialyloligosaccharide selected from the group consisting of 3' sialyllactose, 6' sialyllactose, 6'sialyllactosamine, 3'sialyllactosamine, disialolactose and a mixture thereof.

10. The method of claim 1, wherein hydrolysis of lactose produces glucose and galactose and further comprises isolation of said glucose and said galactose.

11. The method of claim 10, further comprising separation of glucose from galactose.

12. A method of preparing a sialyloligosaccharide containing composition comprising:
   i) hydrolyzing a lactose component of a dairy stream comprising lactose and a sialyloligosaccharide;
   ii) isolating a sialyloligosaccharide component; and
   iii) adding said sialyloligosaccharide component to a composition.

13. The method of claim 12, wherein said sialyloligosaccharide containing composition is selected from the group consisting of an infant formula, a cosmetic composition, a pharmaceutical composition and a food stuff.

14. A composition comprising:
   i) a sialyloligosaccharide;
   ii) glucose; and
   iii) galactose,
   wherein glucose and galactose are present in a ratio of 0.95 to 1.05:1.

15. A method of making glucose and galactose comprising:
   i) hydrolyzing a lactose component of a dairy stream comprising lactose and a sialyloligosaccharide to form glucose and galactose; and
   ii) isolating glucose and galactose.

16. The method of claim 15, further comprising separation of glucose from galactose.

* * * * *